United States Patent [19]
Pollard et al.

[11] Patent Number: 5,375,113
[45] Date of Patent: Dec. 20, 1994

[54] OPTICAL DISK STORAGE TRAY HAVING MULTIPLE STORAGE SITES AND CORRESPONDING DRIVE COMPONENTS

[75] Inventors: Christopher A. Pollard, Monument; Kevin W. McGinnis, Boulder; Delroy E. Miller, Louisville, all of Colo.

[73] Assignee: Sony Electronics Inc., Park Ridge, N.J.

[21] Appl. No.: 90,744

[22] Filed: Jul. 13, 1993

[51] Int. Cl.$^5$ .............................................. G11B 17/22
[52] U.S. Cl. ........................................ 369/30; 369/36; 369/178
[58] Field of Search ........................ 369/30, 34, 35, 36, 369/178, 183, 197; 300/98.01, 98.04, 98.05, 98.06

[56] References Cited

U.S. PATENT DOCUMENTS

| | | | |
|---|---|---|---|
| 4,722,078 | 1/1988 | Nakanishi | 369/178 |
| 5,043,963 | 8/1991 | Iwamoto | 369/36 |
| 5,146,451 | 9/1992 | Kang | 369/178 |
| 5,251,192 | 10/1993 | Liu | 369/36 |
| 5,253,235 | 10/1993 | Isobe et al. | 369/37 |

FOREIGN PATENT DOCUMENTS

| | | | |
|---|---|---|---|
| 0388056 | 9/1990 | European Pat. Off. | 369/30 |
| 2232524 | 12/1990 | United Kingdom | 369/30 |

OTHER PUBLICATIONS

Product Literature For Prior Art: Todd Enterprises CD ROM Server, Nov. 1991.
Product Literature For Prior Art: Meridian Data, Inc. CD ROM Server, Nov. 1991.

*Primary Examiner*—Benny Lee
*Assistant Examiner*—Tan Dinh

[57] ABSTRACT

An optical disk storage tray having a plurality of storage locations, each of which is supplied with a separate optical head and drive mechanism and with common electronics for controlling the optical heads and drive mechanisms and for interfacing them to a host device.

5 Claims, 8 Drawing Sheets

OPTICAL DISK STORAGE TRAY HAVING MULTIPLE STORAGE SITES AND CORRESPONDING DRIVE COMPONENTS

FIELD OF THE INVENTION

The present invention relates to the field of information storage and retrieval. It relates particularly to a low-cost apparatus for storing optical disks and retrieving the data stored on them.

BACKGROUND OF THE INVENTION

Optical disks are an increasingly popular medium for digitally storing information. Information is stored in binary format, with binary zeros represented by non-reflective pits stamped into a plastic disk and binary ones represented by reflective high points on the disk. The data is retrieved by an optical head which directs a laser source onto the surface of the disk and which utilizes a light sensitive photo diode to detect light reflecting from the disk surface. The binary information is converted to electrical signals and decoded into audio and/or video output.

In present large-scale optical disk storage and retrieval systems each disk is installed in a separate cartridge having a separate drive. Each drive is comprised of an enclosed casing which includes the disk and all of the components, including the interface, loading and unloading mechanics, drive mechanics, optical head, and all of electronics which are necessary for retrieving the data from the disk and delivering the data to the host computer. The drives installed in the storage system are multiplexed to the central processing unit.

These extensive storage systems are highly desirable because of their large capacity and because they provide immediate access to data stored on any of the installed disks. However, these storage systems require considerable amounts of bulky hardware and therefore are extremely costly and highly consumptive of space and power. This makes them impractical for use in schools, small libraries and other small businesses.

OBJECT AND SUMMARY OF THE INVENTION

It is an object of the present invention to provide a storage system for optical disks which eliminates much of the costly and duplicative hardware found in systems utilizing drive cartridges.

It is a further object of the present invention to provide a storage system for optical storage disks which provides multiple disk storage sites which have individual drive mechanics but which share common electronics.

The present invention comprises a tray having numerous disk storage sites. Drive mechanics, particularly a motor spindle and an optical head, are positioned at each storage site. Common electronics are provided for controlling the operation of the drive mechanisms and for interfacing the drive mechanisms to the host computer. The degree to which electronics are shared varies between embodiments and depends on the desired cost and speed for performance.

DETAILED DESCRIPTION OF THE DRAWINGS

DETAILED DESCRIPTION OF THE INVENTION

The present invention is comprised generally of a tray 10, several disk storage sites 12, and drive mechanisms 14 positioned at each storage site.

Figure 1:
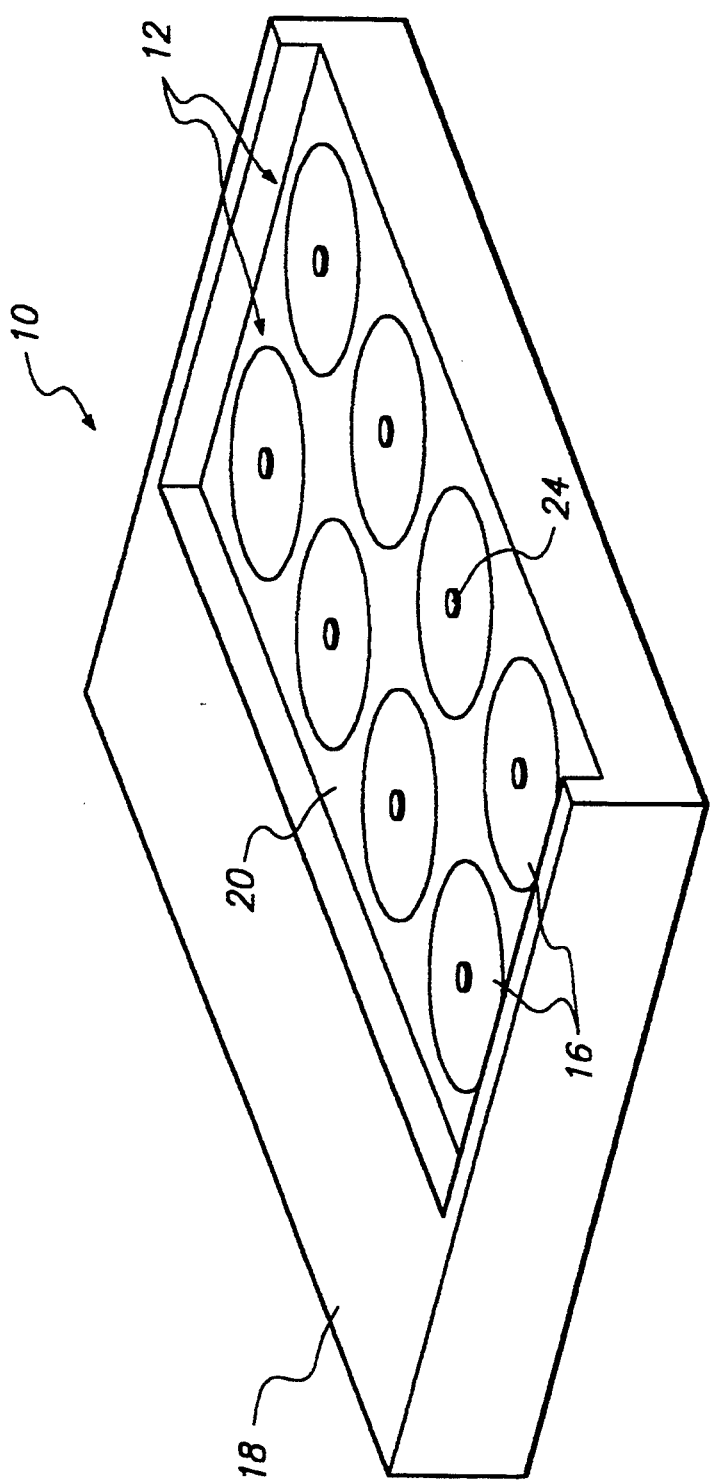
FIG. 1 is a perspective top view showing the tray of the present invention positioned for loading or unloading of disks.
Figure 3:
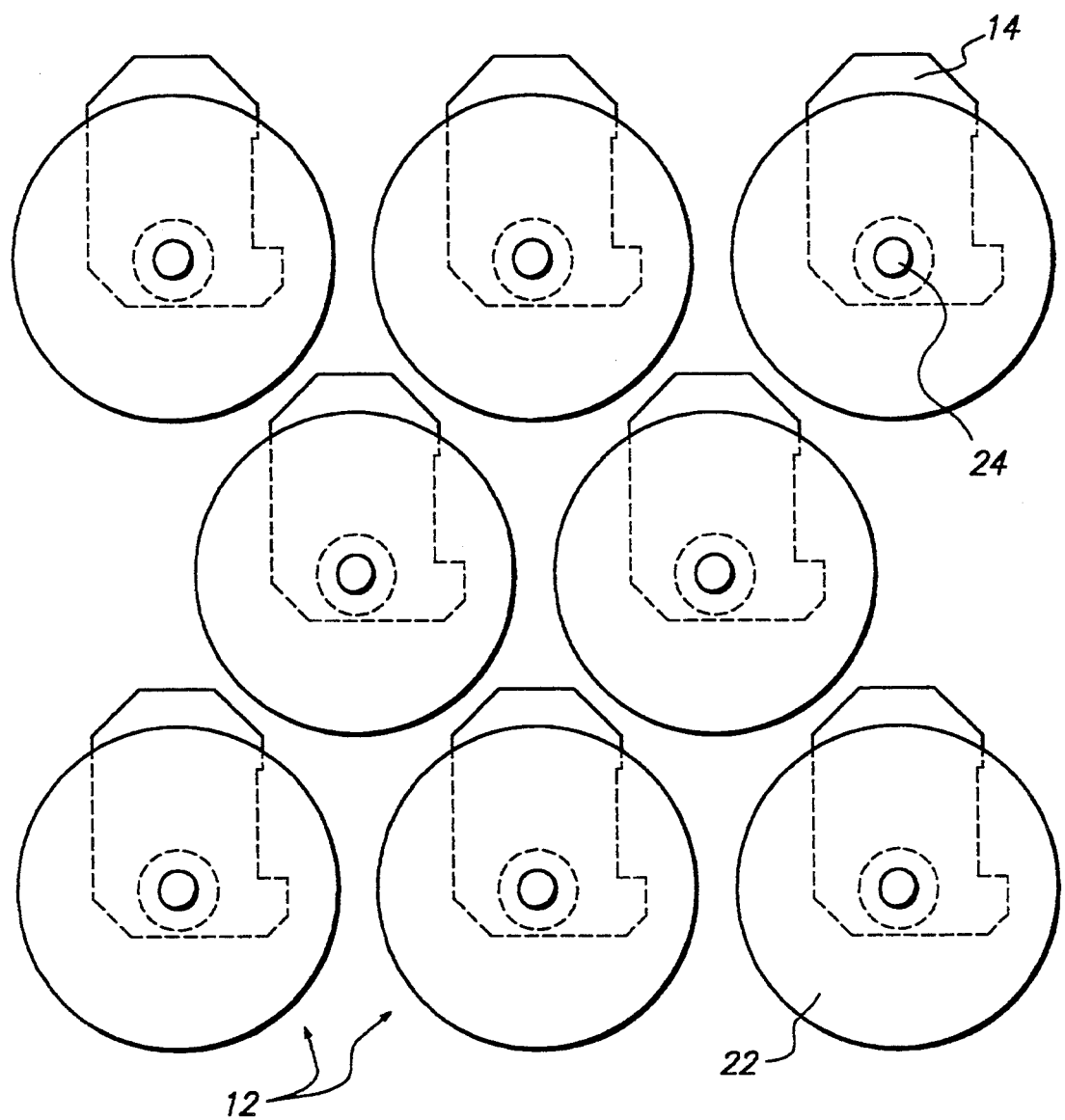
FIG. 3 shows an alternative configuration of disk storage site locations.

FIG. 1 is an embodiment of the invention with the disks 16 in place. The top face 18 of the tray 10 has a rectangular portion 20 which is recessed slightly from the remainder of the top face. The disk storage sites 12 are situated in this recessed rectangular portion 20. The tray is preferably designed to be a drawer which, as with an audio compact disk player, slides in and out of the host device 8 for manual placement and replacement of the disks. The disk storage sites 12 may be arranged in a variety of ways to accommodate varying numbers of disks. FIG. 3 shows one alternative to the disk layout of FIG. 1.

Figure 2:
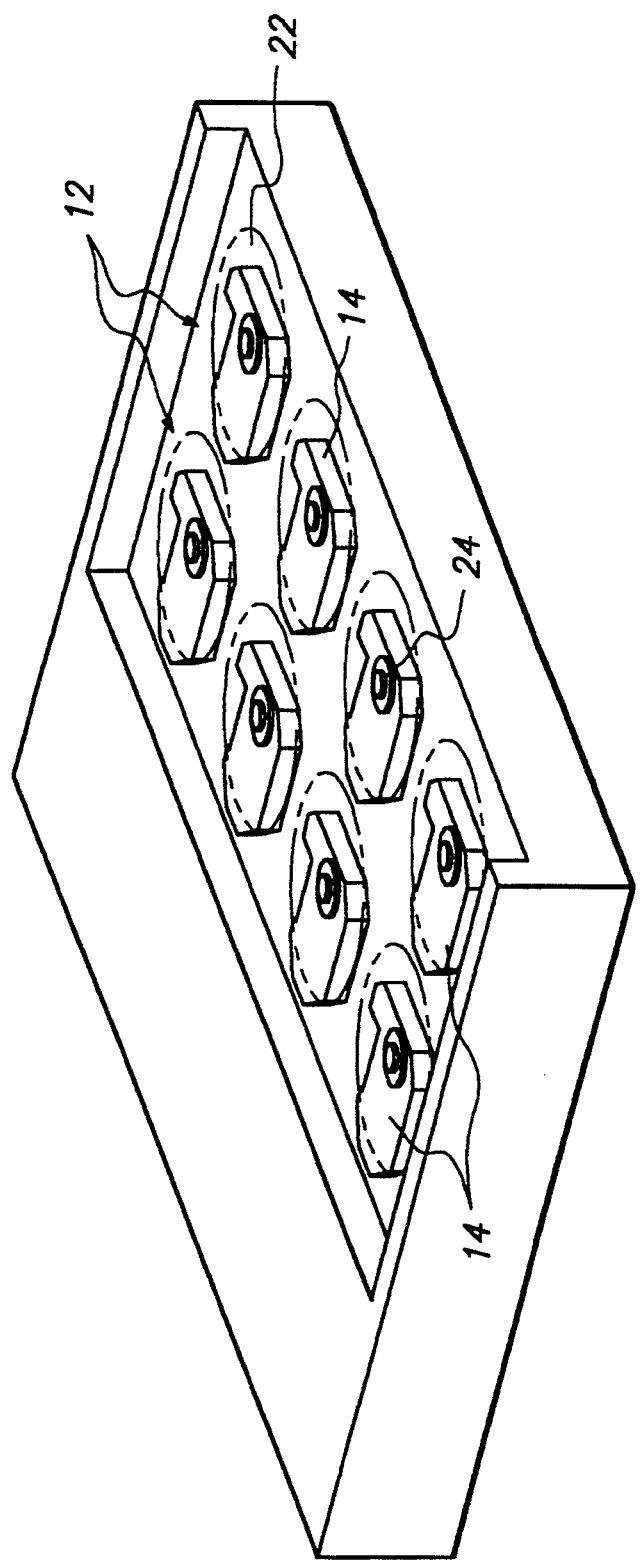
FIG. 2 is a perspective top view of the tray of the present invention showing the drive mechanics positioned at the disk storage sites.
Figure 4:
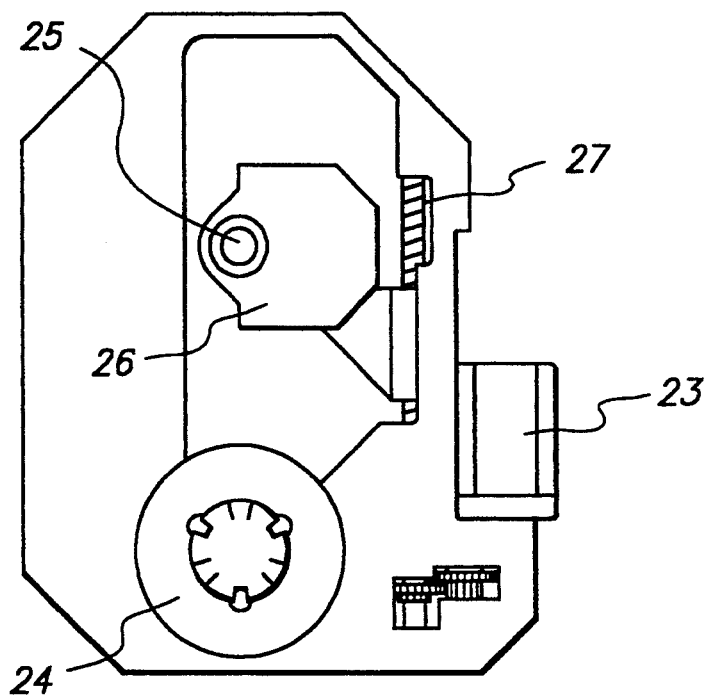
FIG. 4 is a top view of the drive mechanics for a single disk storage site.

FIG. 2 shows the first embodiment of the invention with the disks removed from the disk locations. Each disk storage site 12 is comprised of a circular recess 22 which is sized to accommodate the size of disks (e.g. 5¼ in.) which are to be stored in the tray. Below each circular recess 22 is a drive mechanism 14, a detailed top view of which is shown in FIG. 4. Each drive mechanism is comprised of a motor spindle 24 for rotating the disk when the information on the disk is being read, and an optical head 26 having a lens 25 which reads the information from the disk. A leadscrew 27, which is operated by a motor 23, enables the optical head 26 to travel radially with respect to the center of the disk in order to access information at various locations on the disk. The concept of how to design and construct an optical head is well known to one of skill in the art of optical storage disk technology and need not be repeated here.

Figure 5:
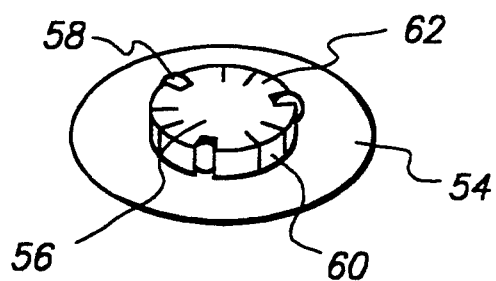
FIG. 5 is a perspective view of a spindle drive mechanism.

A perspective view of the motor spindle is shown in FIG. 5. The motor spindle is comprised of a turntable 54 having an elevated center portion 56 which is sized to fit into the center hole of an optical disk (not shown). Spring loaded disk clamping balls 58 and disk location fingers 60 are biased slightly outward from the perimeter 62 of the elevated center portion 56 so as to grip the disk by exerting friction on the inside perimeter of the hole in the disk.

The electronic components of the present invention may be configured in a variety of ways. The cost of the device as well as the amount of space consumed by the electronics will decrease with increased sharing of the electronics by the drive mechanisms. However, fewer shared electronics may be preferred in order to maintain a higher level of efficiency for the device. FIGS. 6 through 9 provide four examples of circuit implementations that may be utilized with the present invention.

Figure 6:
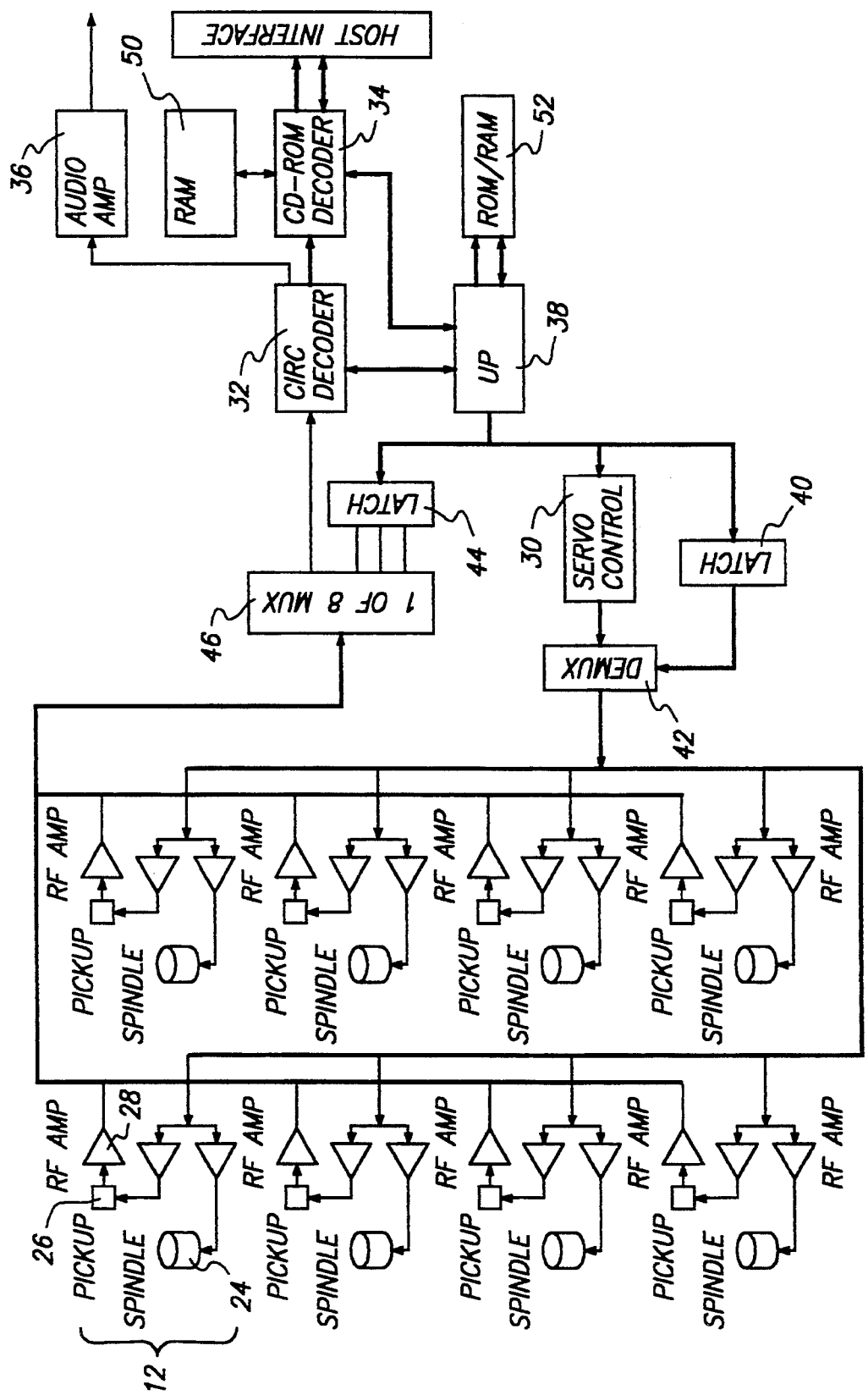
FIGS. 6 through 9 are schematic circuit representations showing decreasing levels of sharing of drive electronics.

FIG. 6 is a schematic representation of an electronics layout utilizing the greatest proportion of shared electronics. Each disk storage site 12 has separate drive components, including a motor spindle 24, an optical pickup 26, and a radio frequency amplifier 28. Each of the drive mechanisms is interfaced to the remaining electronics, which are shared by all of the drive mechanisms. These electronics include the microprocessor 38, a read only memory (ROM) or random access memory (RAM) 52 connected to the microprocessor, servo control 30, cyclical redundancy checker (CIRC decoder) 32, the CD-ROM decoder 34 which is interfaced to the host computer, a random access memory (RAM) 50 which is connected to the CD-ROM decoder 34, and the audio amplifier 36 which is only necessary in systems where disks having audio tracks are installed.

Because a single servo control device 30 is used to control each of the drive mechanisms, a latch device 40 is provided to detect the logic signals from the microprocessor 38 which indicate which drive mechanism should be turned on. A demultiplexer 42 is provided to interpret those signals and to direct the power signal from the servo control 30 to the selected drive. Similarly, a second latch 44 and a multiplexer 46 direct the output data from the selected drive to the decoders 32, 34.

Figure 7:
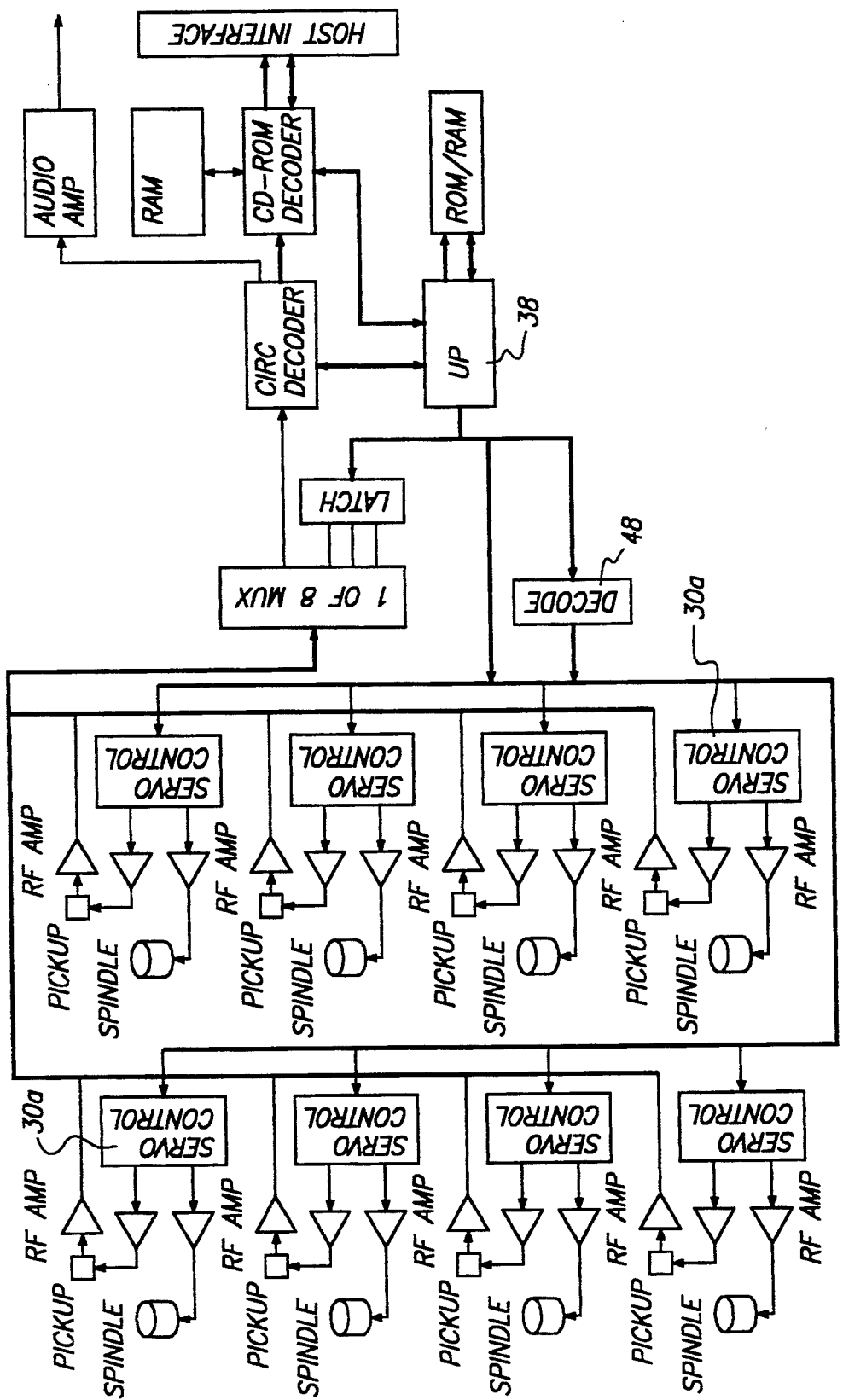

The embodiment of FIG. 7, is similar to the FIG. 5 embodiment except that a separate servo control device 30a is provided for each drive mechanism. Logic lines passing from the microprocessor 38 to a decoder 48 indicate which servo control device is to be activated, and the decoder 48 delivers the activation signal to the indicated device.

Figure 8:
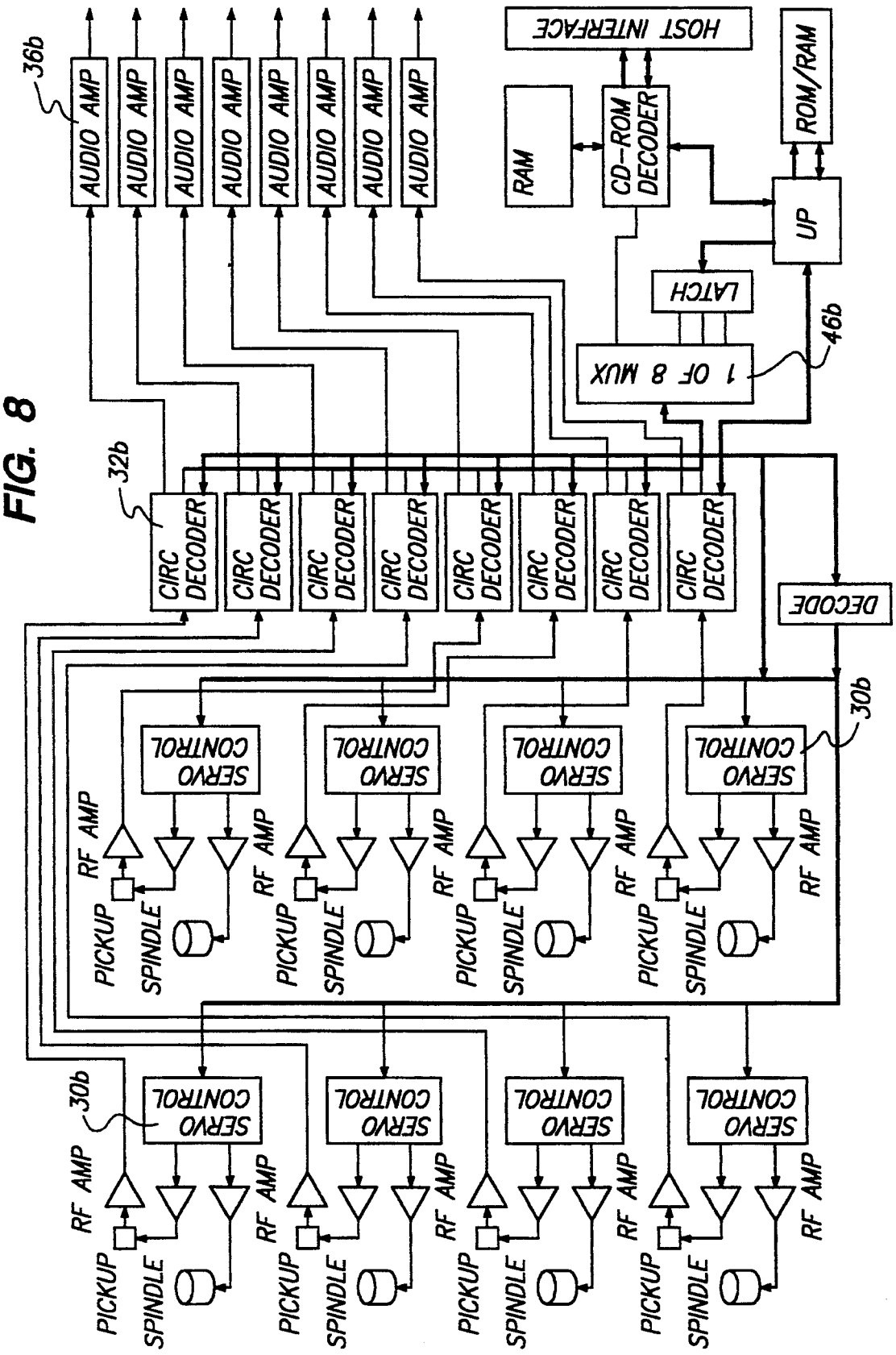

In addition to having a separate servo control device 30b, the embodiment of FIG. 8 provides a separate CIRC decoder 32b and a separate audio amplifier 36b for each drive mechanism. The non-audio component of the output from the CIRC decoder is multiplexed 46b to the CD-ROM decoder 34.

Figure 9:
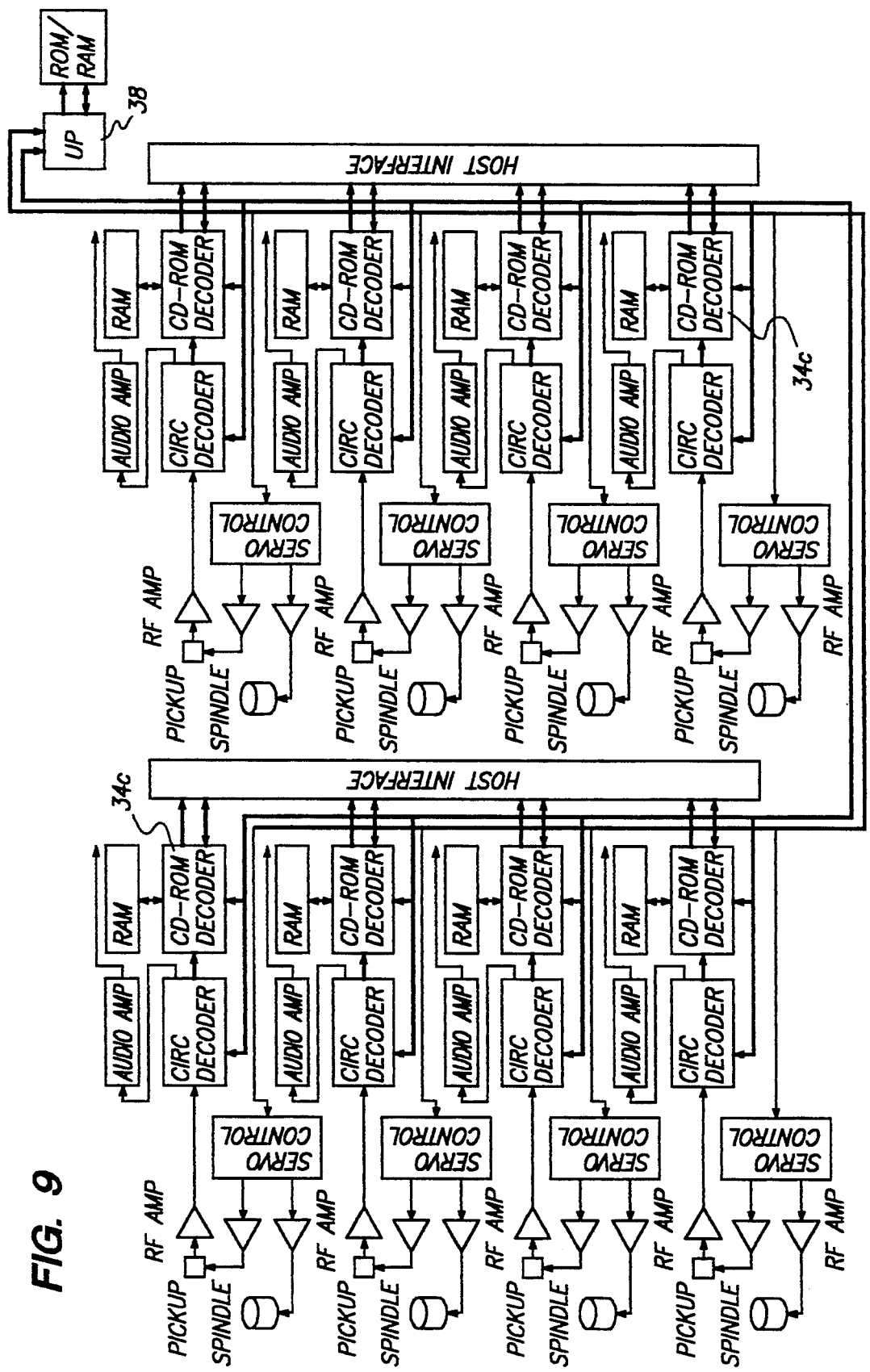

FIG. 9 shows an embodiment which provides the greatest degree of efficiency but which is the most costly and least compact of the embodiments described above. A separate CD-ROM decoder 34c is additionally provided for each drive and is separately interfaced to the host computer. In this embodiment the drives share only the microprocessor device 38.

While varying disk layouts and electronic configurations have been described, many others are possible according to the present invention. The scope of the present invention is not limited to the specific embodiments described above but is rather defined by the claims recited below.

We claim:

1. An apparatus for storing optical disks in several disk locations, and for reading data from a selected optical disk, the apparatus comprising:
    a tray;
    a plurality of disk storage sites located on the tray for storing optical disks;
    a plurality of drive means, each drive means positioned at a separate disk storage site, for reproducing data stored on the optical disks; and
    a single control means for controlling the drive means in common.

2. The apparatus of claim 1 wherein the control means comprises:
    power delivery means for delivering a power signal to a selected drive means positioned at a disk storage site corresponding to the selected optical disk; and
    data receiving means for receiving the data retrieved by the selected drive means and supplying the data to a host computer.

3. The apparatus of claim 2 wherein:
    the power delivery means includes:
        servo control means for generating the power signal and for controlling the operation of the drive means;
        a first latch means for receiving logic signals from a microprocessor, the logic signals indicating the selected drive means; and
        a demultiplexer responsive to the logic signals, for receiving the power signal from the servo control means and for supplying the power signal to the selected drive means.

4. The apparatus of claim 2 wherein:
    the data receiving means includes:
    a second latch means for receiving logic signals from a microprocessor, the logic signals indicating the selected drive means; and
    a multiplexer responsive to the logic signals, for receiving output data from the plurality of drive means and for supplying the data retrieved by the selected drive means to the host computer.

5. The apparatus of claim 2 wherein:
    the power delivery means includes:
        a plurality of servo control means for generating the power signal and for controlling operation of the drive means, each servo control device located at a disk storage site and connected to a drive means; and
        decoder means for receiving logic signals from a microprocessor, the logic signals indicating the selected drive means, and for supplying an activation signal to the servo control means corresponding to the selected drive means.

* * * * *